United States Patent
Uchiyama et al.

(10) Patent No.: US 11,048,150 B2
(45) Date of Patent: Jun. 29, 2021

(54) COVER, CAMERA, AND METHOD OF MANUFACTURING COVER

(71) Applicant: Panasonic Intellectual Property Management Co., Ltd., Osaka (JP)

(72) Inventors: Hirokazu Uchiyama, Osaka (JP); Hiroshi Adachi, Osaka (JP); Yoshihisa Matsuda, Osaka (JP); Tomokiyo Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 16/076,144

(22) PCT Filed: Oct. 26, 2017

(86) PCT No.: PCT/JP2017/038622
§ 371 (c)(1),
(2) Date: Aug. 7, 2018

(87) PCT Pub. No.: WO2018/079638
PCT Pub. Date: May 3, 2018

(65) Prior Publication Data
US 2020/0409237 A1 Dec. 31, 2020

(30) Foreign Application Priority Data
Oct. 28, 2016 (JP) .............................. JP2016-212345

(51) Int. Cl.
G02B 1/18 (2015.01)
G03B 17/56 (2021.01)
G03B 11/04 (2021.01)

(52) U.S. Cl.
CPC .............. *G03B 17/56* (2013.01); *G02B 1/18* (2015.01); *G03B 11/043* (2013.01)

(58) Field of Classification Search
CPC ...................................................... G08B 1/18
See application file for complete search history.

(56) References Cited

U.S. PATENT DOCUMENTS

| 5,300,419 | A | 4/1994 | Seto et al. |
| 9,752,046 | B2 * | 9/2017 | Kawakami ............... C09D 7/40 |

(Continued)

FOREIGN PATENT DOCUMENTS

| CN | 102119348 A | 7/2011 |
| JP | H05-061166 A | 3/1993 |

(Continued)

OTHER PUBLICATIONS

Chinese Office Action issued in corresponding Chinese Patent Application No. 201780010389.X, dated Mar. 18, 2020, with partial English translation.

(Continued)

*Primary Examiner* — Clayton E. LaBalle
*Assistant Examiner* — Leon W Rhodes, Jr.
(74) *Attorney, Agent, or Firm* — McDermott Will & Emery LLP (57) ABSTRACT

A cover, which is intended for a camera, includes: a base material and a laminated layer formed on the base material. The base material includes resin. The laminated layer includes: a contact layer that includes a siloxane acrylic resin, an acrylic resin including silica, or a silane acrylic resin; a hydrophilic layer that includes a silane acrylic resin; and an intermediate layer that includes resin and serves as a binder to bind the contact layer and the hydrophilic layer. The contact layer is disposed closest to the base material, among the contact layer, the intermediate layer, and the hydrophilic layer.

24 Claims, 8 Drawing Sheets

(56) References Cited

U.S. PATENT DOCUMENTS

| 10,422,929 B2* | 9/2019 | Kwon .................. C09D 201/10 |
| 2013/0136436 A1 | 5/2013 | Yoshino et al. |
| 2016/0115342 A1 | 4/2016 | Kawakami et al. |

FOREIGN PATENT DOCUMENTS

| JP | 2003-039621 A | 2/2003 |
| JP | 2004-352826 A | 12/2004 |
| JP | 2008-044133 A | 2/2008 |
| JP | 2008-073963 A | 4/2008 |
| JP | 2008-279736 A | 11/2008 |
| JP | 2011-051266 A | 3/2011 |
| JP | 2011-073359 A | 4/2011 |
| JP | 2013-113908 A | 6/2013 |
| JP | 2013-178540 A | 9/2013 |
| JP | 2013-228745 A | 11/2013 |
| JP | 2014-137574 A | 7/2014 |
| WO | 2014/148254 A1 | 9/2014 |
| WO | 2016/056489 A1 | 4/2016 |

OTHER PUBLICATIONS

Japanese Office Action issued in corresponding Japanese Patent Application No. 2018-547745, dated Feb. 12, 2020.
"Notification of development of Super-hydrophilic Coating Material," May 21, 2013, with English translation.
International Search Report issued in Application No. PCT/JP2017/038622 dated Jan. 23, 2018, with English translation.

\* cited by examiner

| TEST ITEMS | TEST CONDITIONS | TEST RESULTS | |
|---|---|---|---|
| | | COMPARATIVE EXAMPLE | EMBODIMENT |
| LIGHT RESISTANCE TEST | XENON ARC | 1 YEAR | 8 YEARS |
| HIGH-TEMPERATURE /HIGH-HUMIDITY TEST | 60 °C, 90%, 500 HRS. | 40 ° OR GREATER | 15 °C OR LESS |
| SALT SPRAY TEST | SALT WATER SPRAYED FOR 2 HRS. + LEFT WET FOR 22 HRS. PER CYCLE | 3 CYCLES | 9 CYCLES |
| WIPE TEST | COTTON CLOTH, WEIGHTED AT 2 KGF | 4 TIMES | 500 TIMES |

COVER, CAMERA, AND METHOD OF MANUFACTURING COVER

RELATED APPLICATIONS

This application is a national stage of International Application No. PCT/JP2017/038622, filed Oct. 26, 2017, which claims the benefit of Japanese Application No. 2016-212345, filed on Oct. 28, 2016, the disclosures of which are incorporated in their entirety by reference herein.

TECHNICAL FIELD

The present disclosure relates to a cover, a camera that includes the cover, and a method of manufacturing the cover.

BACKGROUND ART

Patent Literature (PTL) 1 discloses a cover that includes a light transmitting substrate, an antireflection layer, a water-repellent antifouling layer, and a light transmission preventing layer. This technology is configured to remove water droplets and dirt by coating the water-repellent antifouling layer.

CITATION LIST

Patent Literature

PTL 1: Japanese Unexamined Patent Application Publication No. 2008-44133

SUMMARY OF THE INVENTION

Technical Problem

The present disclosure provides a cover having an increased visibility, antifouling property, and durability compared with the conventional technology, a camera including such cover, and a method of manufacturing the cover.

Solution to Problem

In order to achieve the above object, the cover according to one aspect of the present disclosure includes a base material and a laminated layer formed on the base material. The base material includes polycarbonate or an acrylic resin. The laminated layer includes: a contact layer that includes a siloxane acrylic polymer coating material; a hydrophilic layer that includes a waterborne coating material that is mainly made of a silane acrylic polymer; and an intermediate layer that includes a resin coating material and serves as a binder to bind the contact layer and the hydrophilic layer. The contact layer, the intermediate layer, and the hydrophilic layer are laminated on the base material in the stated order.

Also, the camera according to another aspect of the present disclosure includes the above-described cover and an image sensor.

Also, the method of manufacturing a cover according to still another aspect of the present disclosure is a method of manufacturing a cover for a camera. Such method includes: applying a siloxane acrylic coating material, an acrylic coating material including silica, or a silane acrylic coating material onto a base material to form a contact layer; applying a resin coating material that serves as a binder onto the contact layer to form an intermediate layer; and applying a waterborne coating material that is mainly made of silane acrylic onto the intermediate layer to form a hydrophilic layer.

Advantageous Effect of Invention

According to the present disclosure, the visibility, antifouling property, and durability of the cover are increased.

DESCRIPTION OF EXEMPLARY EMBODIMENT

Hereinafter, an embodiment will be described in detail with reference to the accompanying drawings, but unnecessarily detailed descriptions may be omitted. For example, detailed descriptions of well-known matters or descriptions of components that are substantially the same as components described previous thereto may be omitted. This is to avoid redundancy and provide easily read descriptions for those skilled in the art.

Note that the accompanying drawings and following detailed description are provided in order for those skilled in the art to fully understand the present disclosure; the accompanying drawings and following detailed description are not intended to limit the scope of the accompanying claims. Also note that the accompanying drawings are schematic, and thus are not necessarily exact illustrations.

In the drawings, the Z axis is an axis lying along the straight line that connects the center of the opening of a cover and the top of the dome shape. When a surveillance camera is installed on a ceiling, for example, the Z axis is an axis that lies along the vertical direction. The X axis and the Y axis are axes orthogonal to each other, both of which are orthogonal in the Z axis direction. When the surveillance camera is installed on a ceiling, for example, the X-Y plane is a plane that lies along the ceiling (the installation surface).

Embodiment

The following describes an embodiment with reference to FIG. 1 through FIG. 7.

[1. Schematic Structure of Surveillance Camera]

Figure 1:
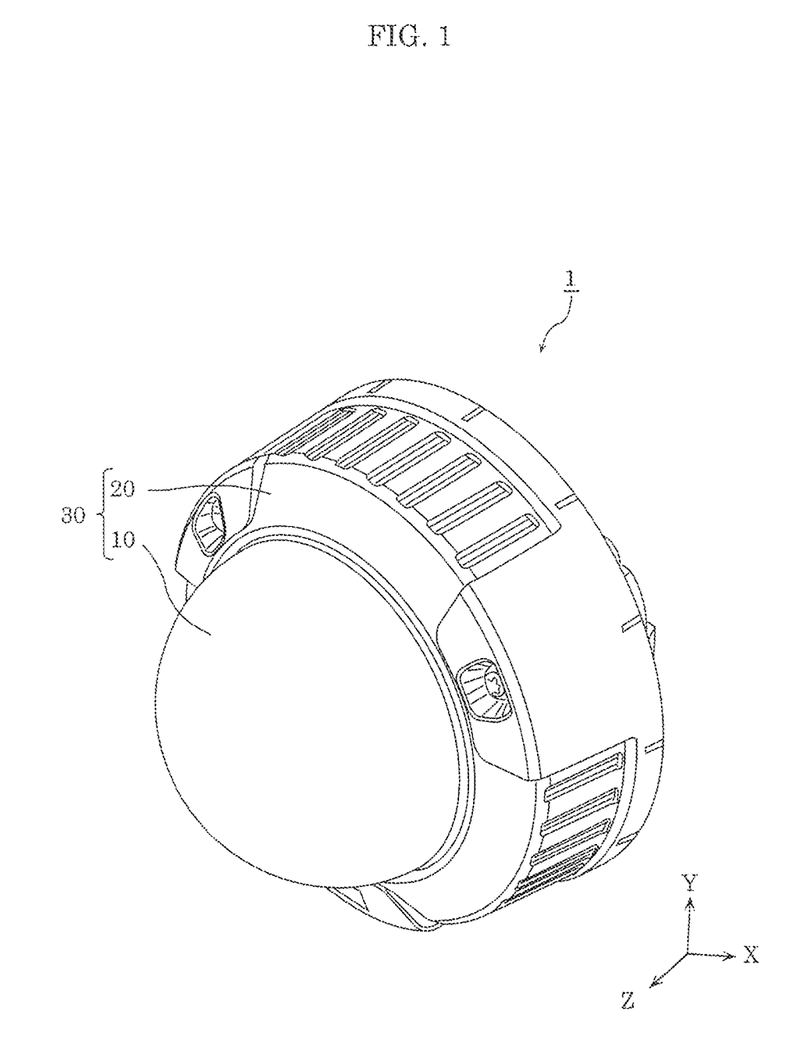
FIG. 1 is a perspective view of a surveillance camera that includes a cover according to an embodiment.

First, a schematic structure of a surveillance camera according to the present embodiment will be described with reference to FIG. 1. FIG. 1 is a perspective view of surveillance camera 1 that includes cover 10 according to the present embodiment. Note that the present embodiment describes an example in which cover 10 is used for surveillance camera 1, but cover 10 is not limited to the application to a surveillance camera.

Figure 2:
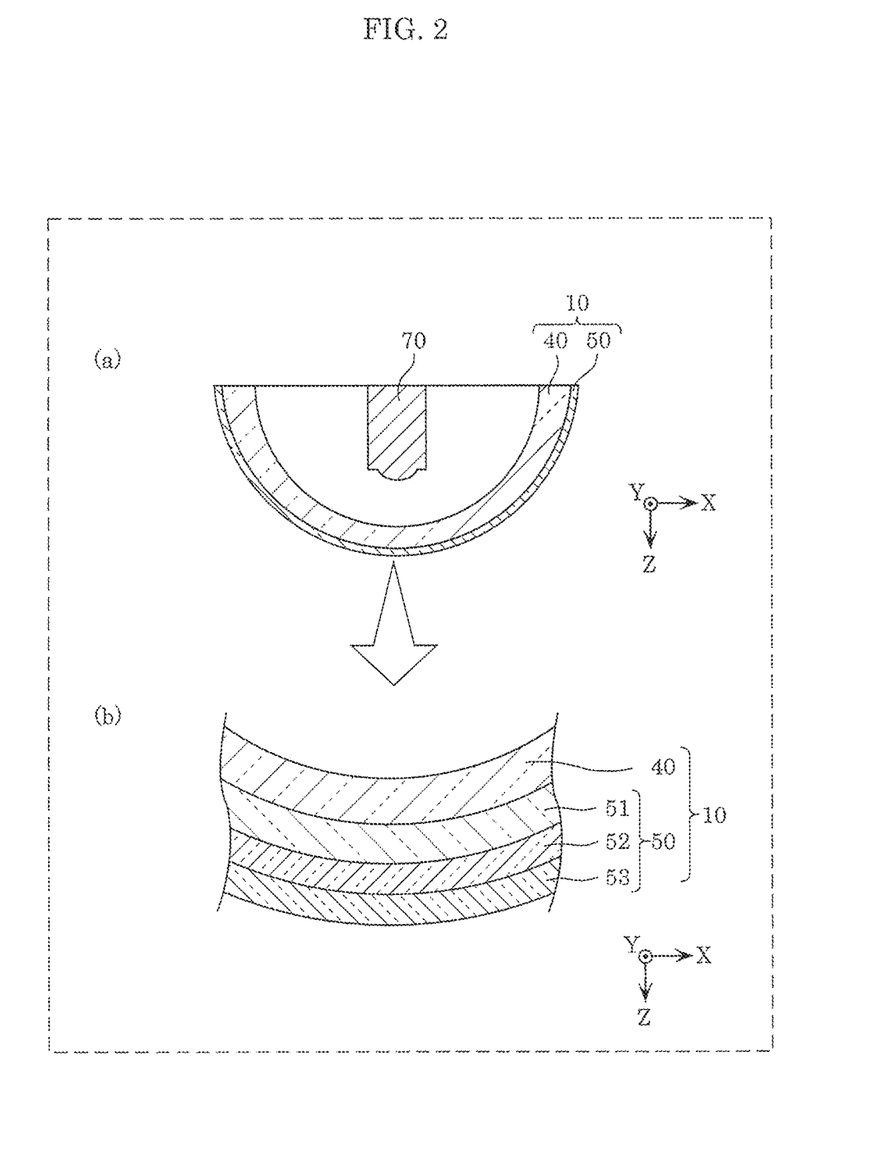
FIG. 2 is a cross-sectional view of the cover according to the embodiment.

As FIG. 1 shows, surveillance camera 1 includes imaging unit 70 (refer to (a) in FIG. 2) that includes a lens tube, and cover part 30 that covers and protects imaging unit 70.

Imaging unit 70 is a camera that includes, for example, an image sensor such as a charge coupled device (CCD) image sensor and a complementary metal oxide semiconductor (COMS) image sensor.

Cover part 30 covers the entirety of imaging unit 70 to form the body of surveillance camera 1. Cover part 30 includes cover 10 that covers across the imaging surface of imaging unit 70, and main body 20 that holds a substantially circular opening of cover 10.

Cover 10 is a cover for a camera (camera cover) that covers the front surface of the lens tube of imaging unit 70 housed in main body 20. Cover 10 according to the present embodiment covers across the imaging region of imaging unit 70. Cover 10 is a translucent member.

Cover 10 is in a substantially hemispherical dome shape. This enables surveillance camera 1 to have a wide view angle, thereby enlarging the imaging region of imaging unit 70. Note that the shape of cover 10 is not limited to a particular shape, and thus cover 10 may be in a substantially tubular shape, a substantially boxy shape, etc. Also note that the expression "substantially hemispherical dome shape" intends to include not only a perfectly hemispherical dome shape, but also a shape that is recognized as being substantially hemispherical dome.

Main body 20 includes a resin material or metal, etc. For example, main body 20 is formed to have a substantially tubular shape with a slightly tapered tip. The substantially circular opening of cover 10 is watertightly fixed to an opening of such substantially tubular shape. A metal member (not shown) that secures surveillance camera 1 to the installation surface such as a wall and a ceiling is attached to the back-end opening of main body 20 (at the side in the Z axis negative direction).

[2. Structure of Cover]

Next, the structure of cover 10 according to the present embodiment will be described with reference to FIG. 2. FIG. 2 is a cross-sectional view of cover 10 according to the present embodiment. (a) in FIG. 2 is a cross-sectional view of cover 10 and imaging unit 70. (b) in FIG. 2 is an enlarged view of a part of cover 10 shown in (a) in FIG. 2.

As (a) in FIG. 2 shows, cover 10 includes base material 40 and laminated layer 50.

Base material 40 includes a resin material with excellent formability and translucency as a base. Base material 40 according to the present embodiment includes a rigid, shock-resistant organic resin material such as polycarbonate. Alternatively, base material 40 may include a resin material with good translucency such as acrylic. Resin materials such as polycarbonate and acrylic, which allow for easy formation, can be formed into a variety of shapes such as a dome shape. Imaging unit 70 is disposed at the internal surface side of base material 40. Note that the refractive index of base material 40 is, for example, 1.59, and that the thickness of base material 40 is, for example, between 0.5 mm and 10 mm, inclusive.

Laminated layer 50 includes layers laminated on a surface of base material 40 (the surface being the external surface and the light incident surface of base material 40) in a cross-sectional view. As (a) in FIG. 2 shows, laminated layer 50 covers substantially the entirety of the surface of base material 40. Also, as (b) in FIG. 2 shows, laminated layer 50 includes contact layer 51, intermediate layer 52, and hydrophilic layer 53 that are laminated in the stated order. Stated differently, laminated layer 50 has a trilaminar structure. More specifically, contact layer 51, intermediate layer 52, and hydrophilic layer 53 are laminated in the stated order on the surface of base material 40 (the surface at the side of the Z axis positive direction) in an outward direction of base material 40 (in the Z axis positive direction in (b) in FIG. 2). As such, base material 40 is structured to avoid direct exposure to an external environment. Stated differently, laminated layer 50 is a protection layer that protects base material 40 from an external environment. Laminated layer 50 also has translucency.

Contact layer 51 is a layer for increasing contact between base material 40 and laminated layer 50. Contact layer 51 includes, for example, a siloxane acrylic polymer coating material. The use of an acrylic polymer coating material increases contact with base material 40 that includes polycarbonate, etc. This structure prevents base material 40 and laminated layer 50 from peeling off from each other after a long-time exposure to an external environment (an outdoor environment).

The siloxane acrylic polymer that constitutes contact layer 51 is, for example, a resin, etc. formed by binding, to one terminal of polysiloxane, an acrylic resin such as urethane acrylate. Alternatively, an acrylic polymer including amorphous silica or a silane acrylic polymer may be used. The refractive index of contact layer 51 is, for example, 1.54.

Hydrophilic layer 53, which has a hydrophilic property, is a layer for increasing the visibility and antifouling property of surveillance camera 1. Hydrophilic layer 53 includes, for example, a waterborne coating material that is mainly made of a silane acrylic polymer. For example, hydrophilic layer 53 is a carpet-like polymer thin film (an acrylic polymer brush) formed on a surface of intermediate layer 52. Hydrophilic layer 53, being a polymer brush, achieves and maintains a high hydrophilic property.

The silane acrylic polymer that constitutes hydrophilic layer 53 is, for example, a polymer brush material having a silanol group at one terminal. The refractive index of hydrophilic layer 53 is, for example, 1.35.

In general, an organic material has a lower hardness and a lower resistance to ultraviolet light, etc. than an inorganic material. As such, the use of a composite resin material formed by combining an acrylic polymer, which is an organic resin material, and an inorganic material such as a silane material increases mechanical strength and light resistance, compared with the case where hydrophilic layer 53 includes an organic resin material.

Note that hydrophilic layer 53 does not include a photocatalyst. Stated differently, the irradiation of sunlight, etc. (typically, ultraviolet light) does not provide hydrophilic property (super-hydrophilic property) to hydrophilic layer 53.

The level of contact between contact layer 51 and hydrophilic layer 53 is low. For this reason, the formation of hydrophilic layer 53 immediately on contact layer 51 involves concerns such as about the peeling off of contact layer 51 and hydrophilic layer 53 from each other. In view of this, intermediate layer 52 is provided that serves as a binder to bind contact layer 51 and hydrophilic layer 53.

Intermediate layer 52 is formed between contact layer 51 and hydrophilic layer 53. Stated differently, intermediate layer 52 is in contact with both contact layer 51 and hydrophilic layer 53, and has a high level of contact with both of the layers. Intermediate layer 52 includes, for example, a resin coating material that includes at least one of amorphous silica and a polysilicate compound. More specifically, intermediate layer 52 including silica or silicate increases the hardness of laminated layer 50. This prevents scratches, chipping, etc. that may occur on base material 40 by, for example, contact with an object (the mechanical strength is increased).

Amorphous silica and a polysilicate compound that constitute intermediate layer 52 are, for example, an organic-inorganic material formed by adding amorphous silica to a solvent that is obtained by preparing one or more of tetramethoxysilane, tetraethoxysilane, tetrapropoxysilane, ethyl polysilicate, butyl polysilicate, methyl cellosolve orthosilicate, n-propyl orthosilicate, tetramethyl silicate, etc. Alternatively, methacryl silicone polymer may be used. Note that the refractive index of intermediate layer 52 is, for example, 1.35, and that intermediate layer 52 may have a hydrophilic property.

Contact layer 51 or intermediate layer 52 may include a light absorbing agent. Contact layer 51 or intermediate layer 52 may include, for example, a UV absorbing agent. The UV absorbing agent is, for example, a benzophenone or benzotriazole UV absorbing agent. Base material 40 according to the present embodiment includes an organic resin material. In general, an organic resin material is less resistant to ultraviolet light than an inorganic resin material. As such, contact layer 51 or intermediate layer 52 including an UV absorbing agent prevents base material 40 from being degraded by UV light. Stated differently, contact layer 51 or intermediate layer 52 including an UV absorbing agent increases the durability (light resistance) of cover 10.

Note that the light absorbing agent is not limited to a UV absorbing agent. For example, the light absorbing agent may be a material that absorbs a specific visible light, or may be a material that absorbs infrared rays. Also note that contact layer 51 or intermediate layer 52 may include a light stabilizer, together with a UV absorbing agent. Example light stabilizers include a hindered amine light stabilizer, etc. This structure enables the detoxification of radicals generated by ultraviolet light, thereby preventing the degradation of the resin.

Meanwhile, ultraviolet light irradiation may degrade laminated layer 50, resulting in the thinning and peeling off of the film. This leads to a failure to maintain desired performance. For this reason, a light absorbing agent may be included in intermediate layer 52, which is the external layer (closer to an external environment), out of contact layer 51 and intermediate layer 52. This structure prevents contact layer 51 from being degraded by ultraviolet light.

When cover 10 is in a substantially hemispherical dome shape, the total film thickness of intermediate layer 52 and hydrophilic layer 53 is, for example, between 60 nm and 180 nm, inclusive. Intermediate layer 52 and hydrophilic layer 53 with the total film thickness of 60 nm or less have lowered performance. Stated differently, the performance of intermediate layer 52 serving as a binder, and the performance of hydrophilic layer 53 providing visibility and antifouling property are decreased. Meanwhile, intermediate layer 52 and hydrophilic layer 53 with the total film thickness of 180 nm or greater involves concerns such as about the occurrence of cracking and the lowering of light permeability. Note that when cover 10 is not in a substantially hemispherical dome shape, the total film thickness of intermediate layer 52 and hydrophilic layer 53 may be a value other than the above-described values. Also note that the film thickness of the contact layer is not limited to a particular value.

[3. Mechanism to Increase Visibility]

Figure 3A:
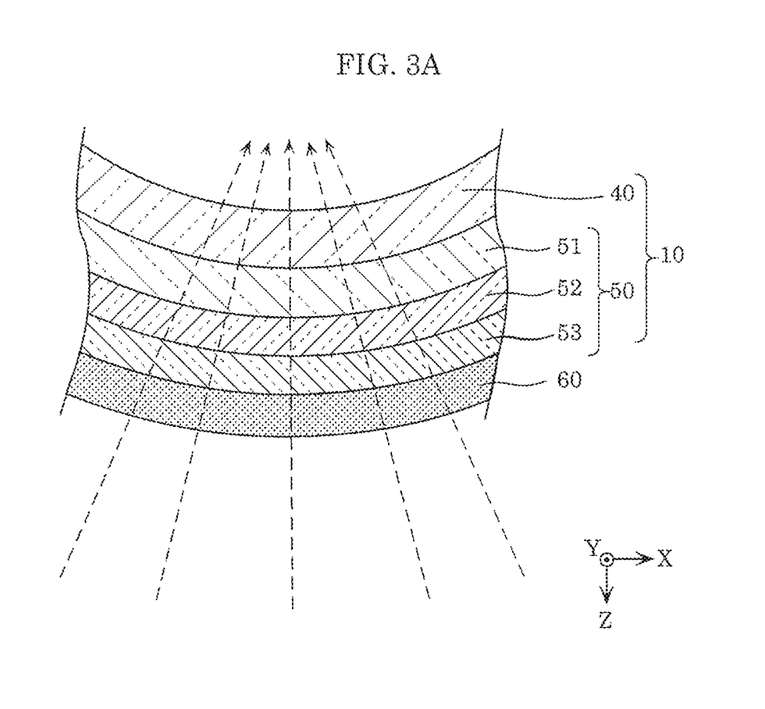
FIG. 3A is a diagram illustrating the visibility of the cover according to the embodiment.
Figure 3B:
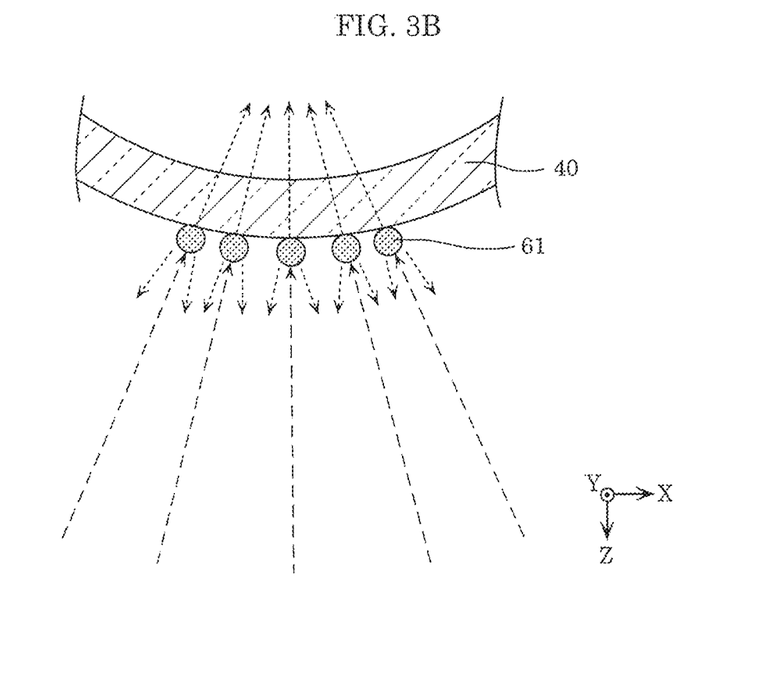
FIG. 3B is a diagram illustrating the visibility of a cover according to comparative example 1.
Figure 3C:
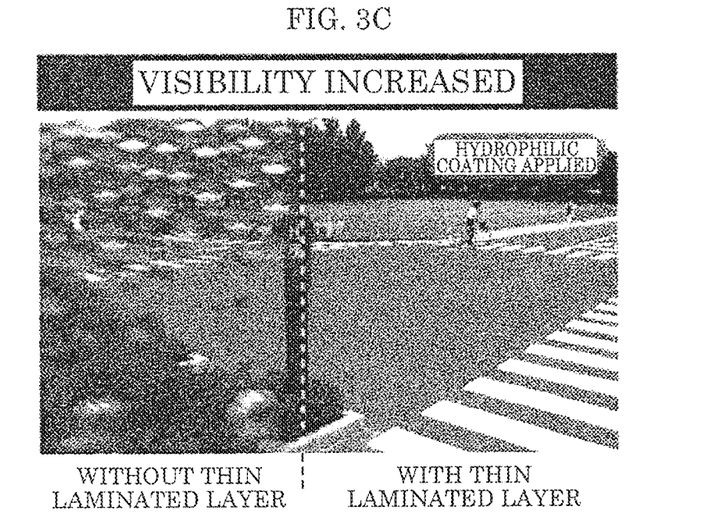
FIG. 3C is a diagram comparing the visibility of images from the surveillance camera according to the embodiment.

Next, a mechanism to increase the visibility of cover 10 according to the present embodiment will be described with reference to FIG. 3A to FIG. 3C. FIG. 3A is a diagram illustrating the visibility of cover 10 according to the present embodiment. FIG. 3B is a diagram illustrating the visibility of a cover according to comparative example 1. Note that FIG. 3A and FIG. 3B are enlarged views of a part of cover 10. FIG. 3C is a diagram comparing the visibility of images from surveillance camera 1 according to the present embodiment.

Note that the cover according to comparative example 1 is a cover without laminated layer 50, and thus its base material 40 is directly exposed to an external environment. Also note that dashed arrows in the diagrams represent incident light to surveillance camera 1 from outside of surveillance camera 1. Although not shown in the diagrams, imaging unit 70 is disposed on an extension of each dashed arrow to receive incident light coming inside of cover 10.

When surveillance camera 1 is installed outdoors, cover 10 is subjected to water droplets when it rains. Cover 10 according to the present embodiment includes hydrophilic layer 53 on its outermost layer, which makes it difficult for water droplets to form a bead-like shape. As FIG. 3A shows, the water droplets spread thinly across hydrophilic layer 53 to form water film 60. This structure prevents light from diffusely reflecting at the interface between air and water film 60, thereby enabling surveillance camera 1 to capture fine images (with high visibility).

The right-hand side (the right-hand side of the dashed line) of FIG. 3C shows an image actually captured by surveillance camera 1 including cover 10 shown in FIG. 3A according to the present embodiment. As the right-hand side of FIG. 3C shows, cover 10 including laminated layer 50 (hydrophilic layer 53) provides an image with such high visibility as to make the water droplets unrecognizable on the image.

Meanwhile, when water droplets 61 form on the cover according to comparative example 1 (the cover without laminated layer 50 (hydrophilic layer 53)), a water film is not formed, and thus water droplets 61 remain as they are. This causes incident light to water droplets 61 to be diffusely reflected by water droplets 61. Incident light that reaches base material 40 through water droplets 61 and incident light that reaches base material 40 directly from air (without going through water droplets 61) are refracted differently. This results in the decrease in the visibility of images captured by the surveillance camera. Also, when a water-repellent layer is formed on base material 40, water droplets 61 are more likely to form a bead-like shape, which causes light to be more diffusely reflected.

The left-hand side (the left-hand side of the dashed line) of FIG. 3C shows an image actually captured by the surveillance camera including the cover shown in FIG. 3B according to comparative example 1. As the left-hand side of FIG. 3C shows, the cover without laminated layer 50 (hydrophilic layer 53) makes water droplets recognizable on the image, thereby decreasing the visibility of the image.

As described above, cover 10 according to the present embodiment increases the visibility of images captured by surveillance camera 1.

[4. Mechanism to Increase Antifouling Property]

Figure 4A:
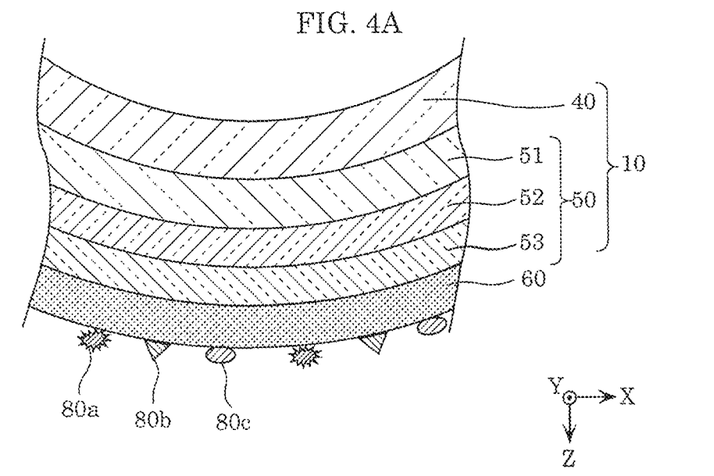
FIG. 4A is a diagram illustrating the antifouling property of the cover according to the embodiment.
Figure 4B:
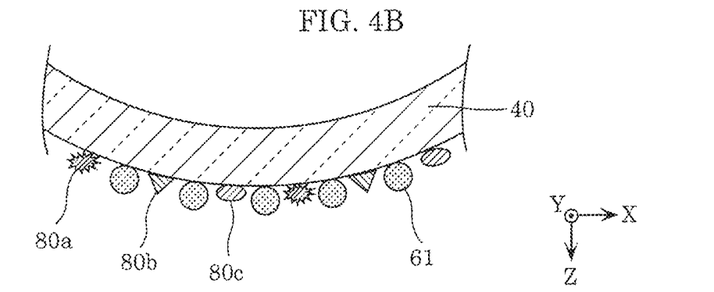
FIG. 4B is a diagram illustrating the antifouling property of a cover according to comparative example 2.
Figure 4C:
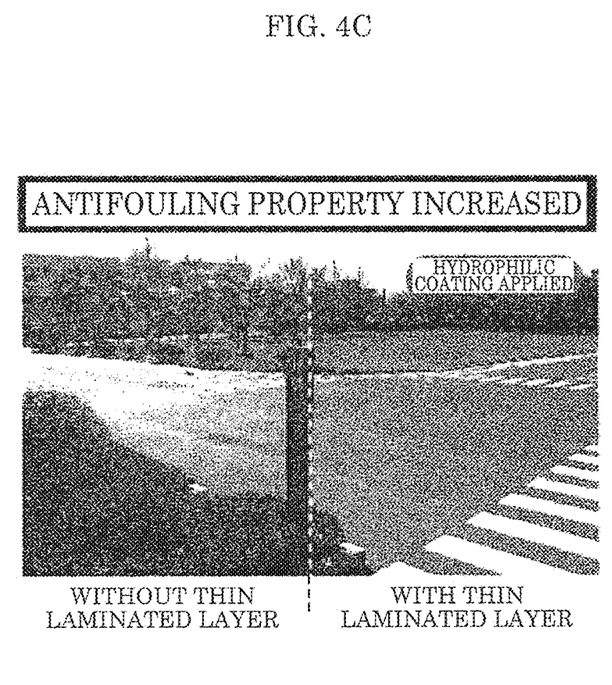
FIG. 4C is a diagram comparing images that exhibit the antifouling property of the surveillance camera according to the embodiment.

Next, a mechanism to increase the antifouling property of cover 10 according to the present embodiment will be described with reference to FIG. 4A to FIG. 4C. FIG. 4A is a diagram illustrating the antifouling property of cover 10 according to the present embodiment. FIG. 4B is a diagram illustrating the antifouling property of a cover according to comparative example 2. Note that FIG. 4A and FIG. 4B are enlarged views of a part of cover 10. FIG. 4C is a diagram comparing images that exhibit the antifouling property of surveillance camera 1 according to the present embodiment.

When surveillance camera 1 is installed outdoors, cover 10 is subjected to a various kinds of dirt 80a to dirt 80c. Dirt 80a to dirt 80c are, for example, all kinds of dust, etc. Dirt 80a to dirt 80c, when depositing on cover 10, decrease the visibility of images captured by surveillance camera 1.

When dirt 80a to dirt 80c deposit on the surface of cover 10 (hydrophilic layer 53) according to the present embodiment, after which water droplets form on cover 10 due to rain, etc., the water droplets turn into a film on hydrophilic layer 53, as described above, to form water film 60 having a substantially uniform film thickness. Hydrophilic layer 53 has a hydrophilic property, and thus has a good affinity for water. Stated differently, hydrophilic layer 53 and water droplets are likely to be bound. For this reason, when turning into a film, water droplets penetrate further into the cover 10 side than dirt 80a to dirt 80c to form water film 60 in contact with hydrophilic layer 53. This structure causes dirt 80a to dirt 80c depositing on cover 10 to float, as FIG. 4A shows, thereby washing away dirt 80a to dirt 80c from the surface of cover 10 (self-cleaning takes place). Stated differently, cover 10 has a high antifouling property. This enables surveillance camera 1 to capture images with high visibility.

The right-hand side (the right-hand side of the dashed line) of FIG. 4C shows an image actually captured by surveillance camera 1 including cover 10 shown in FIG. 4A according to the present embodiment. As the right-hand side of FIG. 4C shows, cover 10 including laminated layer 50 (hydrophilic layer 53) enables the shooting of an image with high visibility.

Meanwhile, when dirt 80a to dirt 80c deposit on the cover according to comparative example 2 (without laminated layer 50 (hydrophilic layer 53)), after which water droplets 61 form on the cover due to rain, etc., water droplets 61 remain as they are as described above. Stated differently, self-cleaning will not take place, and thus dirt 80a to dirt 80c remain on the surface of the cover (base material 40) as FIG. 4B shows. This results in the decrease in the visibility of images captured by the surveillance camera.

The left-hand side (the left-hand side of the dashed line) of FIG. 4C shows an image actually captured by the surveillance camera including the cover shown in FIG. 4B according to comparative example 2. As the left-hand side of FIG. 4C shows, the cover without laminated layer 50 (hydrophilic layer 53) provides a blurred image with low visibility.

When used for a camera for which maintenance work (cleaning, etc.) is not easy to carry out, such as a camera installed at a high place, cover 10 having a high antifouling property enables the shooting of images with high visibility without necessitating maintenance work.

[5. Manufacturing Method]

Figure 5:
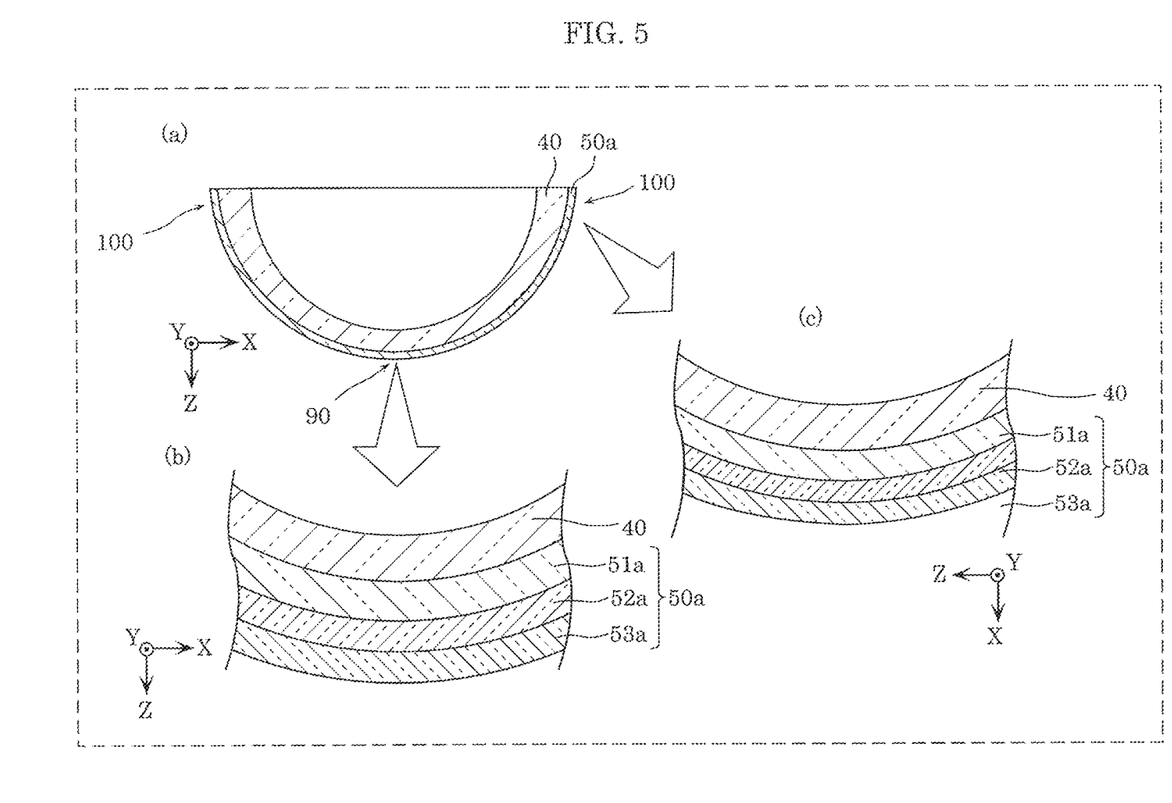
FIG. 5 is a cross-sectional view of the cover according to the embodiment, when the film thickness at a top portion is greater than the film thickness at a bottom portion.
Figure 6:
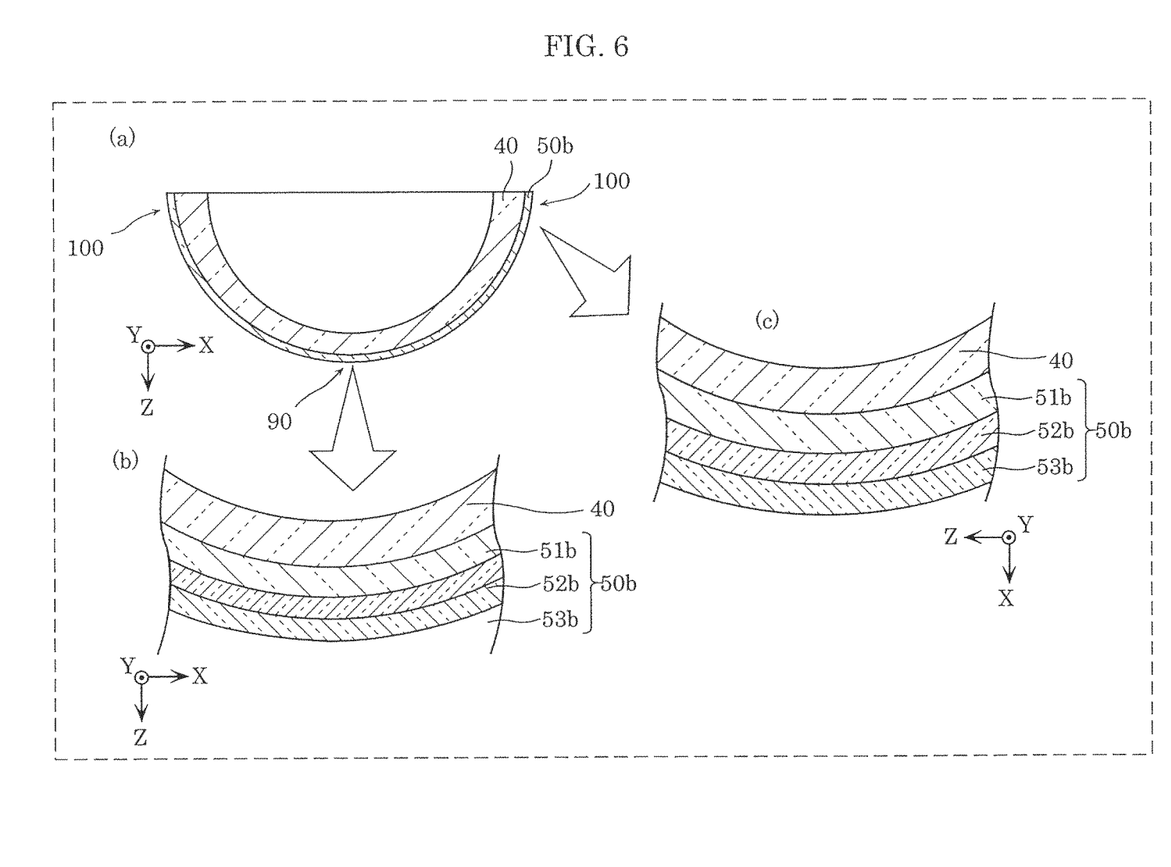
FIG. 6 is a cross-sectional view of the cover according to the embodiment, when the film thickness at the bottom portion is greater than the film thickness at the top portion.

Next, a manufacturing method of forming laminated layer 50 onto base material 40 in a substantially hemispherical dome shape will be described with reference to FIG. 5 and FIG. 6. FIG. 5 is a cross-sectional view of the cover according to the present embodiment, when the film thickness at top portion 90 is greater than the film thickness at bottom portion 100. FIG. 6 is a cross-sectional view of the cover according to the present embodiment, when the film thickness at bottom portion 100 is greater than the film thickness at top portion 90.

Spin coating and dip coating are among example methods of forming laminated layer 50 onto base material 40 in a substantially hemispherical dome shape. The following describes the respective film formation methods, but omits the description of curing and other processes (drying and firing, etc.).

Spin coating is a film formation method in which a coating material (which is a material for film formation, and which, in the present embodiment, is a coating material that forms each layer) is fed to base material 40, which is then spun so that the coating material is stretched by the centrifugal force to be formed into a thin film. Dip coating is a film formation method in which base material 40 is dipped in a coating material, after which base material 40 is picked up for thin film formation. For example, after picked up, base material 40 is spun so that the coating material is stretched by the centrifugal force to be formed into a thin film.

When base material 40 is spun, the resulting film thickness of laminated layer 50 formed on base material 40 can vary within the layer between the following cases: where base material 40 is spun for film formation, with the top portion of base material 40 in a substantially hemispherical dome shape facing down (e.g., facing down vertically); and where base material 40 is spun for film formation, with the top portion of base material 40 in a substantially hemispherical dome shape facing up (e.g., facing up vertically).

For example, when base material 40 is spun with its top portion facing down, the resulting film thickness at top portion 90 of the substantially hemispherical dome shape can be greater than the film thickness at bottom portion 100.

(a) in FIG. 5 is a diagram showing laminated layer 50a formed on base material 40 in the case where the film thickness at top portion 90 of the substantially hemispherical dome shape is greater than the film thickness of bottom portion 100. (b) in FIG. 5 is an enlarged view of top portion 90 of the cover of (a) in FIG. 5. (c) in FIG. 5 is an enlarged view of bottom portion 100 of the cover of (a) in FIG. 5.

As (b) in FIG. 5 and (c) in FIG. 5 show, the film thickness of each of contact layer 51a, intermediate layer 52a, and hydrophilic layer 53a is greater at top portion 90 than the film thickness at bottom portion 100. For example, the total film thickness of intermediate layer 52a and hydrophilic layer 53a at top portion 90 of the substantially hemispherical dome shape (a first total film thickness) is between 1.2-fold and 2.0-fold, inclusive, compared to the total film thickness of intermediate layer 52a and hydrophilic layer 53a at bottom portion 100. For example, intermediate layer 52a and hydrophilic layer 53a may be formed such that their total film thickness falls between 60 nm and 180 nm, inclusive, and that the first total film thickness satisfies the above condition.

Meanwhile, when base material 40 is spun with its top portion facing up, for example, the resulting film thickness at bottom portion 100 of the substantially hemispherical dome shape can be greater than the film thickness at top portion 90.

(a) in FIG. 6 is a diagram showing laminated layer 50b formed on base material 40 in the case where the film thickness at bottom portion 100 of the substantially hemispherical dome shape is greater than the film thickness at top portion 90. (b) in FIG. 6 is an enlarged view of top portion 90 of the cover of (a) in FIG. 6. (c) in FIG. 6 is an enlarged view of bottom portion 100 of the cover of (a) in FIG. 6.

As (b) in FIG. 6 and (c) in FIG. 6 show, the film thickness of each of contact layer 51b, intermediate layer 52b, and hydrophilic layer 53b is greater at bottom portion 100 than the film thickness at top portion 90. For example, the total film thickness of intermediate layer 52b and hydrophilic layer 53b at bottom portion 100 of the substantially hemispherical dome shape (a second total film thickness) is between 1.2-fold and 2.0-fold, inclusive, compared to the total film thickness of intermediate layer 52b and hydrophilic layer 53b at top portion 90. For example, intermediate layer 52b and hydrophilic layer 53b may be formed such that their total film thickness falls between 60 nm and 180 nm, inclusive, and that the second total film thickness satisfies the above condition.

The formation of laminated layers 50, 50a, or 50b onto base material 40 in a substantially hemispherical dome shape is thus possible by a general method such as spin coating and dip coating. Note that the above description uses, as non-limiting examples of formation methods, spin coating or dip coating for the formation of laminated layers 50, 50a, or 50b. When base material 40 is in a plate-like shape, a formation method such as slit coating, flow coating, die coating, roll coating, and spraying may be used.

Note that although the above description is about an example in which the film thickness at top portion 90 and the film thickness at bottom portion 100 are different in a substantially hemispherical dome shape, each layer may be formed to have a substantially uniform film thickness from the view point of achieving images with higher visibility. For example, hydrophilic layer 53 may be formed to have a substantially uniform film thickness throughout top portion 90 and bottom portion 100.

[6. Experimental Results]

Figure 7:
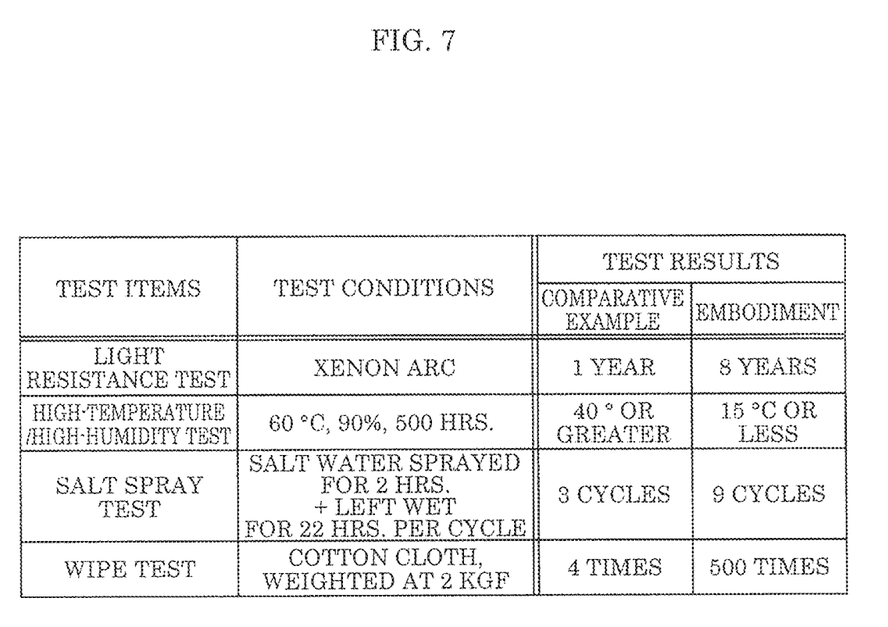
FIG. 7 is a diagram showing the results of tests conducted on the cover.

Next, the results of various tests conducted on cover 10 will be described with reference to FIG. 7. FIG. 7 is a diagram showing the results of the various tests conducted on cover 10. Note that the comparative example in FIG. 7 shows the test results on a cover in which a hydrophilic layer that includes an inorganic resin material, such as a silicone resin, is formed on base material 40. Meanwhile, the embodiment in FIG. 7 shows the test results on cover 10 that includes a UV absorbing agent. The items of the tests conducted are "light resistance test" (JIS K 5600-7-7, JIS B 7754), "high-temperature/high-humidity test" (IEC-60068-2-66), "salt spray test" (JIS Z 2371), and "wipe test" (JIS K5600).

First, the light resistance test will be described. The light resistance test is an irradiation test by use of a xenon arc lamp, the intensity distribution of which for each wavelength is close to that of sunlight. Cover 10 is degraded by exposure to light, which results in the decrease in its performance. For example, base material 40 will be discolored, or the hydrophilic property of hydrophilic layer 53 will be decreased. In this test, the comparison is made between the periods (the number of years) before the performance figures of the respective covers reach a predetermined value or less. As FIG. 7 shows, while one year is taken before the performance figure of the comparative example reaches the predetermined value or less, eight years taken before the performance figure of the embodiment reaches the predetermined value or less. Stated differently, the rate of degradation caused by light of cover 10 according to the embodiment is slower than the rate of degradation caused by light of the cover of the comparative example. This result shows that cover 10 according to the present embodiment has an increased resistance to light, i.e., the durability is increased.

Next, the high-temperature/high-humidity test will be described. The conditions for the high-temperature/high-humidity test are that the temperature is 60° C., the relative humidity is 90%, and the testing time is 500 hours. The high-temperature/high-humidity test compares the water contact angles after the test. Stated differently, the test mainly checks the degradation of hydrophilic layer 53 in the high-temperature/high-humidity test. It can be said that the smaller a contact angle is, the higher hydrophilic property is. As FIG. 7 shows, while the contact angle of the comparative example is 40° or greater, the contact angle of the embodiment is 15° or less, which indicates that the embodiment maintains a low contact angle even after the test. This result shows that cover 10 according to the present embodiment is capable of maintaining a high hydrophilic property for a long period of time, i.e., the durability is increased.

Next, the salt spray test will be described. The conditions for the salt spray test (for one cycle) are that covers are salt sprayed for 2 hours, and then left wet for 22 hours. Salt water in the form of mist is sprayed onto the surface of the covers to mainly check their external appearances, such as whether the covers have any discoloration or peeling. The test compares the number of cycles taken before any abnormality occurs on the external appearances. As FIG. 7 shows, while three cycles are taken by the comparative example, nine cycles by the embodiment, which indicates that the embodiment has a long-time durability. This result shows that cover 10 according to the present embodiment has an increased resistance to corrosion, i.e., the durability is increased.

Finally, the wipe test will be described. The conditions for the wipe test to wipe the surface of cover 10 are that the material is a cotton cloth, and the weight is at 2 Kgf. The test compares the number of times for which cover 10 has been wiped before any abnormality occurs on the external appearance by wiping the surface of cover 10 at that weight. As FIG. 7 shows, while the number of times taken by the comparative example is 4, the number of times taken by the embodiment is 500, which indicates that the embodiment has a significantly longer durability. This result shows that cover 10 according to the present embodiment has an increased resistance to abrasion, i.e., the durability is increased.

As described above, cover 10 according to the present embodiment has an increased durability.

[7. Effect, Etc.]

As described above, cover 10 according to the present embodiment includes base material 40 and laminated layer 50 formed on base material 40. Base material 40 includes polycarbonate or an acrylic resin. Laminated layer 50 includes contact layer 51, intermediate layer 52, and hydrophilic layer 53. Contact layer 51 includes a siloxane acrylic polymer coating material, hydrophilic layer 53 includes a waterborne coating material that is mainly made of a silane acrylic polymer, and intermediate layer 52 includes a resin coating material and serves as a binder to bind contact layer 51 and hydrophilic layer 53. Contact layer 51, intermediate layer 52, and hydrophilic layer 53 are laminated on base material 40 in the stated order.

With this structure, contact layer 51, intermediate layer 52, and hydrophilic layer 53 are laminated in the stated order on a surface of base material 40. Contact layer 51 is a layer for increasing contact between base material 40 and laminated layer 50. Constituted by an acrylic polymer coating material, contact layer 51 increases contact between base material 40 that includes polycarbonate, etc., and laminated layer 50. Constituted by a waterborne coating material that is mainly made of an acrylic polymer, hydrophilic layer 53 has a high hydrophilic property and a high antifouling property. Hydrophilic layer 53 has a high hydrophilic property, and it is thus difficult for water droplets thereon to form a bead-like shape. Moreover, a high hydrophilic property of hydrophilic layer 53 enables dirt depositing thereon to be removed by self-cleaning. When used in a camera (e.g., surveillance camera 1), therefore, cover 10 including hydrophilic layer 53 enables the shooting of images with high visibility even when any water droplet or dirt deposits on cover 10.

Also, hydrophilic layer 53, including a silane material, which is an inorganic material, increases its mechanical strength and resistance to light. Stated differently, the durability of cover 10 is increased. Furthermore, by including intermediate layer 52, contact layer 51 and hydrophilic layer 53 are bound together.

The above-described features increase the visibility, antifouling property, and durability of cover 10 according to the present embodiment.

Also, contact layer 51 or intermediate layer 52 includes a light absorbing agent.

This structure, when the light absorbing agent is a UV absorbing agent, for example, prevents base material 40 from being degraded by ultraviolet light. The durability (resistance to light) of cover 10 is thus increased.

Also, the resin coating material that constitutes intermediate layer 52 further includes at least one of amorphous silica and a polysilicate compound.

Since intermediate layer 52 includes silica or silicate, the rigidity (hardness) of laminated layer 50 is increased. Stated differently, this structure prevents scratches, chipping, etc. that may occur on base material 40 by, for example, contact with an object, and thus increases the durability (the mechanical strength) of cover 10.

Also, a total film thickness of intermediate layer 52 and hydrophilic layer 53 is between 60 nm and 180 nm, inclusive.

This structure, even when cover 10 is in a substantially hemispherical dome shape, enables intermediate layer 52 and hydrophilic layer 53 to have desired performance. More specifically, intermediate layer 52 and hydrophilic layer 53 having a total film thickness of 60 nm or greater achieves a high visibility and a high antifouling property. Meanwhile, intermediate layer 52 and hydrophilic layer 53 having a total film thickness of 180 nm or less prevents the occurrence of cracking, etc.

Also, cover 10 is in a substantially hemispherical dome shape. A total film thickness of intermediate layer 52 and hydrophilic layer 53 at bottom portion 100 of the substantially hemispherical dome shape may be, compared to a total film thickness of intermediate layer 52 and hydrophilic layer 53 at top portion 90, between 1.2-fold and 2.0-fold, inclusive. Also, cover 10 is in a substantially hemispherical dome shape. A total film thickness of intermediate layer 52 and hydrophilic layer 53 at top portion 90 of the substantially hemispherical dome shape may be, compared to the total film thickness at bottom portion 100, between 1.2-fold and 2.0-fold, inclusive.

This structure, when cover 10 is in a substantially hemispherical dome shape, enables laminated layer 50, 50a, or 50b to be formed on base material 40 by a typical method such as spin coating and dip coating.

Also, cover 10 is a camera cover that covers the front surface of the lens tube of a camera.

Cover 10 as thus described, when used in a camera, enables the shooting of images with high visibility, even when the camera is used outdoors, etc.

Also, in the present embodiment, the camera includes the above-described cover and an image sensor.

This structure enables the shooting of images with high visibility, even when the camera is used outdoors, etc.

Other Embodiments

The embodiment has been described above as an exemplary technique of the present disclosure, for which the accompanying drawings and detailed description have been provided.

The structural components illustrated in the accompanying drawings and the detailed description can thus include not only structural components that are essential to solve the problem, but also structural components that are not essential to solve the problem, for the purpose of illustrating the above technique. As such, the unessential structural components should not be immediately judged as essential, because of the reason that such unessential structural components are illustrated in the accompanying drawings and the detailed description.

The above embodiment intends to illustrate the technique of the present disclosure, and thus allows for various modifications, replacements, additions, omissions, etc., within the scope of the claims or the equivalent scope the claims.

For example, although the aforementioned embodiment has described an example in which cover 10 is used in surveillance camera 1, the present embodiment is not limited to this. Cover 10 may be thus used, for example, in a digital camera, a video camera, etc. having an image sensor. In such a case, cover 10 is a camera cover that covers the front surface of the lens tube of the camera. Also, laminated layer 50 as thus described may be formed on a surface, for example, of a lens (base material) of a digital camera or a video camera.

Cover 10 may also be used other than in a camera. For example, cover 10 may be used in a resin window. This enables dirt, etc., depositing on the resin window (cover 10) to be removed by self-cleaning.

Also, although the embodiment has described an example in which laminated layer 50 is formed on a surface of base material 40, laminated layer 50 may be formed on the back surface (which is the internal surface of base material 40, and which, in the present embodiment, is the surface covering the imaging region of imaging unit 70) of base material 40. This allows for the shooting of images with high visibility, even when water droplets form on the back surface of base material 40 due to condensation, etc.

Also, although the aforementioned embodiment has described an example in which the respective layers (contact layer 51, intermediate layer 52, and hydrophilic layer 53) of laminated layer 50 are formed by spin coating or dip coating, the present embodiment is not limited to this. Contact layer 51, intermediate layer 52, and hydrophilic layer 53 may be each formed by a different formation method.

Also, although the aforementioned embodiment has described the case where base material 40 is spun with its top portion facing up and where base material 40 is spun with its top portion facing down, the preset embodiment is not limited to this. For example, the layers of laminated layer 50 may be formed by spinning base material 40 alternately with its top portion facing up and facing down. Alternatively, base material 40 may be spun with its top portion diagonally tilted.

INDUSTRIAL APPLICABILITY

The present disclosure is applicable to a surveillance camera, etc., installed outdoors. In particular, the present disclosure is effective for use in a camera that is installed at a place where maintenance work is not easy to carry out, such as a surveillance camera, etc., installed at a high place.

The invention claimed is:

1. A cover for a camera, the cover comprising:
a base material; and
a laminated layer formed on the base material,
wherein the base material includes resin,
the laminated layer includes: a contact layer that includes a siloxane acrylic resin, an acrylic resin including silica, or a silane acrylic resin; a hydrophilic layer that includes a silane acrylic resin; and an intermediate layer that includes resin and serves as a binder to bind the contact layer and the hydrophilic layer,
the contact layer is disposed closest to the base material, among the contact layer, the intermediate layer, and the hydrophilic layer,
the hydrophilic layer is a polymer brush, and
the resin that constitutes the intermediate layer includes amorphous silica.

2. The cover according to claim 1,
wherein the siloxane acrylic resin has an acrylic resin at one terminal of polysiloxane.

3. The cover according to claim 1,
wherein the resin that constitutes the intermediate layer further includes a polysilicate compound.

4. The cover according to claim 3,
wherein the resin that constitutes the intermediate layer includes at least one of tetramethoxysilane, tetraethoxysilane, tetrapropoxysilane, ethyl polysilicate, butyl polysilicate, methyl cellosolve orthosilicate, n-propyl orthosilicate, and tetramethyl silicate.

5. The cover according to claim 1,
wherein the intermediate layer has a hydrophilic property.

6. The cover according to claim 1,
wherein the polymer brush has a silanol group at one terminal.

7. The cover according to claim 6,
wherein the polymer brush is a carpet-like polymer brush.

8. The cover according to claim 1,
wherein a total film thickness of the intermediate layer and the hydrophilic layer is between 60 nm and 180 nm, inclusive.

9. The cover according to claim 1,
wherein the contact layer or the intermediate layer includes a light absorbing agent.

10. The cover according to claim 9,
wherein the light absorbing agent includes a UV absorbing agent.

11. The cover according to claim 10,
wherein the UV absorbing agent is a benzophenone UV absorbing agent or a benzotriazole UV absorbing agent.

12. The cover according to claim 9,
wherein the contact layer or the intermediate layer further includes a hindered amine light stabilizer.

13. The cover according to claim 9,
wherein the light absorbing agent is included in the intermediate layer.

14. The cover according to claim 1,
wherein the resin that constitutes the base material is a polycarbonate resin or an acrylic resin.

15. The cover according to claim 1,
wherein a thickness of the base material is between 0.5 mm and 10 mm, inclusive.

16. The cover according to claim 1,
wherein the base material is in a substantially hemispherical dome shape, a substantially tubular shape, a substantially boxy shape, or a plate-like shape.

17. The cover according to claim 9,
wherein the cover is in the substantially hemispherical dome shape, and a total film thickness of the intermediate layer and the hydrophilic layer at a bottom portion of the substantially hemispherical dome shape is, compared to the total film thickness at a top portion, between 1.2-fold and 2.0-fold, inclusive.

18. The cover according to claim 16,
wherein the cover is in the substantially hemispherical dome shape, and a total film thickness of the intermediate layer and the hydrophilic layer at a top portion of the substantially hemispherical dome shape is, compared to the total film thickness at a bottom portion, between 1.2-fold and 2.0-fold, inclusive.

19. A camera comprising:
the cover according to claim 1; and
an image sensor.

20. A method of manufacturing a cover for a camera, the method comprising:
applying a siloxane acrylic coating material, an acrylic coating material including silica, or a silane acrylic coating material onto a base material to form a contact layer;
applying a resin coating material that serves as a binder onto the contact layer to form an intermediate layer, the resin coating including amorphous silica; and
applying a waterborne coating material that is mainly made of silane acrylic onto the intermediate layer to form a hydrophilic layer that includes a polymer brush.

21. The method according to claim 20,
wherein spin coating or dip coating is used to apply: the siloxane acrylic coating material, the acrylic coating material including silica, or the silane acrylic coating material;
the resin coating material; and the waterborne coating material.

22. The method according to claim 21, further comprising:
forming the intermediate layer and the hydrophilic layer to have a total thickness between 60 nm and 180 nm, inclusive, after the applying of the resin coating material and the waterborne coating material by the spin coating or the dip coating.

23. The method according to claim 20,
wherein the base material is in a plate-like shape, and
one of spin coating, dip coating, slit coating, flow coating, die coating, roll coating, and spraying is used to apply:
the siloxane acrylic coating material, the acrylic coating material including silica, or the silane acrylic coating material; the resin coating material; and the waterborne coating material.

24. The method according to claim 23, further comprising:
forming the intermediate layer and the hydrophilic layer to have a total thickness between 60 nm and 180 nm, inclusive, after the applying of the resin coating material and the waterborne coating material by one of the spin coating, the dip coating, the slit coating, the flow coating, the die coating, the roll coating, and the spraying.

* * * * *